US007663765B2

(12) United States Patent
Yuan

(10) Patent No.: US 7,663,765 B2

(45) Date of Patent: Feb. 16, 2010

(54) REFRACTIVE-INDEX MEASUREMENT SYSTEM AND METHOD FOR MEASURING REFRACTIVE-INDEX

(75) Inventor: Kun-I Yuan, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 28 days.

(21) Appl. No.: 12/170,741

(22) Filed: Jul. 10, 2008

(65) Prior Publication Data

US 2009/0161114 A1 Jun. 25, 2009

(30) Foreign Application Priority Data

Dec. 19, 2007 (CN) .......................... 200710203254

(51) Int. Cl.
*G01B 9/02* (2006.01)
*G01B 11/02* (2006.01)

(52) U.S. Cl. ....................................... 356/515; 356/495

(58) Field of Classification Search ................. 356/481, 356/495, 515, 517

See application file for complete search history.

(56) References Cited

U.S. PATENT DOCUMENTS 3,930,732 A * 1/1976 Holly ......................... 356/489
6,018,393 A * 1/2000 Takishima et al. .......... 356/513

* cited by examiner

*Primary Examiner*—Patrick J Connolly
(74) *Attorney, Agent, or Firm*—Andrew C. Cheng

(57) ABSTRACT

A refractive-index measurement system includes a light source, a first beam splitter, a first reflective mirror, a second reflective mirror, a second beam splitter, a container, a first polarizer, and a second polarizer. The first beam splitter splits light emitted from the light source into first and second light beams. The first light beam and the second light beam are reflected by the first reflective mirror and the second reflective mirror, respectively, incident into the second light beam splitter. The container is positioned along an optical pathway of first light beam. The container accommodates a lens and is filled with a medium having a refractive index substantially the same as a theoretical refractive index of the lens. The first polarizer is positioned along the optical pathway of the first light beam. The second polarizer is positioned along an optical pathway of the second light beam.

13 Claims, 4 Drawing Sheets

20

201

202

203

REFRACTIVE-INDEX MEASUREMENT SYSTEM AND METHOD FOR MEASURING REFRACTIVE-INDEX

BACKGROUND

1. Field

The present invention generally relates to a measurement system and method, and particularly to a measurement system and method for measuring a change in the refractive index of a lens.

2. Description of Related Art

Generally, optical lenses are manufactured by injection molding, which is advantageous for mass production at a low cost. During injection molding of the lenses, upper and lower molds are assembled to correspond to the desired contour of the lens, which is formed by injecting a molten material into a space between the molds.

However, internal force can be generated within a body of the lens due to defects on the molds or imprecision in manufacturing, with internal stress distributed where the internal force occurs. A change in the refractive index of the lens may correspondingly occur in the area where the internal stress is distributed.

Referring to FIG. 4, a conventional measurement system 20 for detecting a change in the refractive index of a lens experiencing internal stress includes a first polarizer 201, a second polarizer 202, and a light source 203 stacked in that order. The lens 30 to be measured is disposed between the first polarizer 201 and the second polarizer 202. In use, the light source 203 emits light through the second polarizer 202, the lens 30, and the first polarizer 201. An operator observes emitted light with the naked eye from an end away from the light source 203. Because the interference of light waves can be observed when the refractive index of the lens 30 changes, location of the internal stress in the lens can be detected accordingly. However, such measures cannot precisely detect the magnitude of the change in the refractive index.

What is needed, therefore, is a measurement system and method providing improved and reliable results.

SUMMARY

A refractive-index measurement system for measuring a change in the refractive-index of a lens is provided. In one embodiment, the refractive-index measurement system includes a light source, a first beam splitter, a first reflective mirror, a second reflective mirror, a second beam splitter, a container, a first polarizer, and a second polarizer. The first beam splitter splits light emitted from the light source into first and second light beams. The first light beam is reflected by the first reflective mirror incident into the second light beam splitter. The second light beam is reflected by the second reflective mirror incident into the second beam splitter. The container is positioned on an optical pathway of the first light beam. The container accommodates the lens and is filled with a medium having a refractive index substantially the same as a theoretical refractive index of the lens. The first polarizer is positioned on the optical pathway of first light beam. The second polarizer is positioned on an optical pathway of second light beam.

Advantages and novel features of the present refractive-index measurement system and method will become more apparent from the following detailed description of preferred embodiments when taken in conjunction with the accompanying drawings.

BRIEF DESCRIPTION OF THE DRAWINGS

The components in the drawing are not necessarily drawn to scale, the emphasis instead being placed upon clearly illustrating the principles of the present invention.

Figure 1:
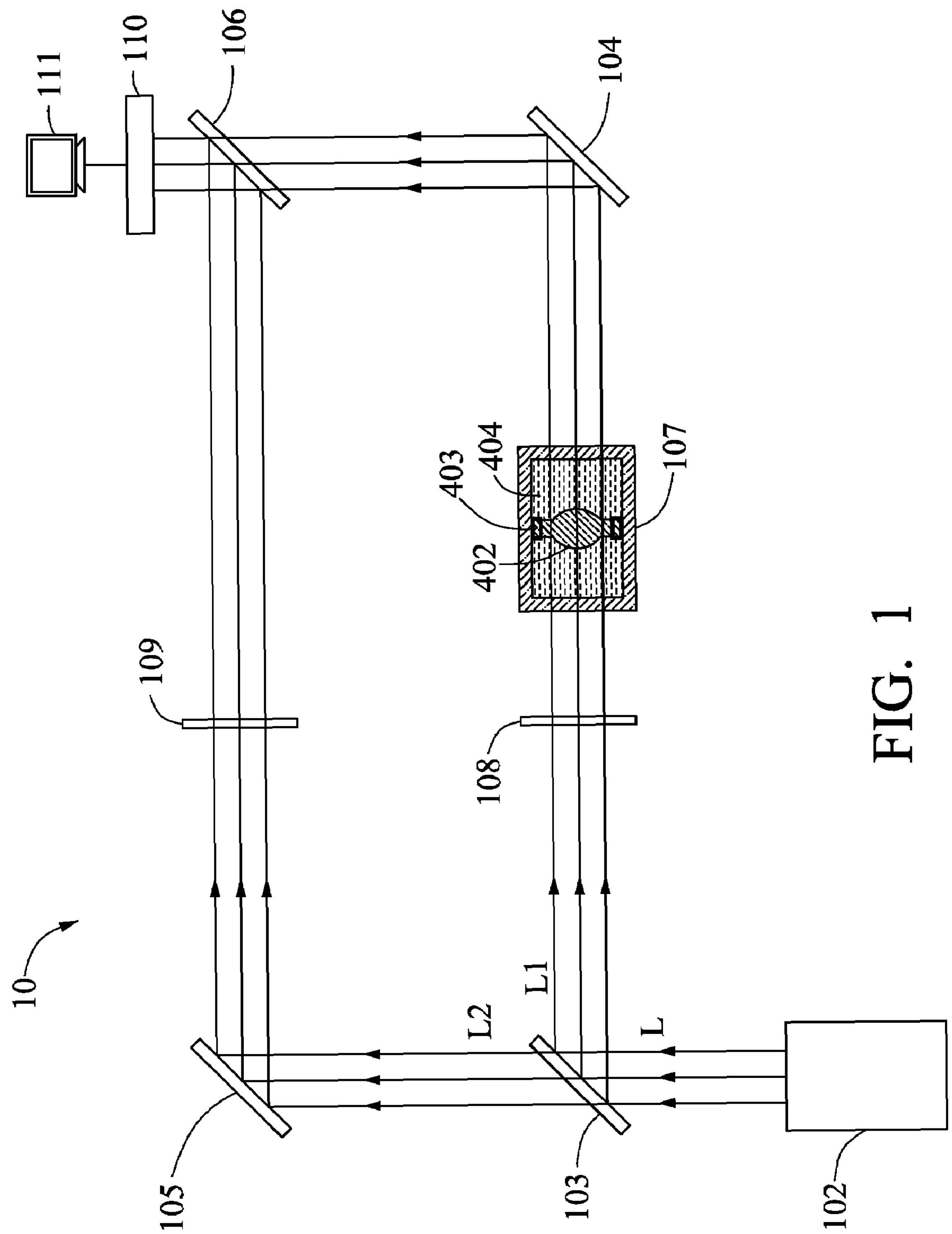
FIG. 1 is a schematic view of a refractive-index measurement system in accordance with an embodiment of the present invention.

Corresponding reference characters indicate corresponding parts. The exemplifications set out herein illustrate one preferred or exemplary embodiment of the present refractive-index measurement system and method, in various forms, and such exemplifications are not to be construed as limiting the scope of the invention in any manner.

DETAILED DESCRIPTION OF THE EMBODIMENT

Reference will now be made to the drawings to describe embodiments of the present refractive-index measurement system and method in detail.

Referring to FIG. 1, a refractive-index measurement system 10 in accordance with an exemplary embodiment, is shown. The refractive-index measurement system 10 is configured for measuring a change in the refractive index of a lens 402. In such case, the lens 402 has a theoretical refractive index $n_a$, which represents a refractive index of the lens with no internal stress present. Changes in the refractive index relative to the theoretical refractive index $n_a$ occur when internal force is generated within the lens 402. The refractive-index measurement system includes a light source 102, a first beam splitter 103, a first reflective mirror 104, a second reflective mirror 105, a second beam splitter 106, a container 107, a first polarizer 108, and a second polarizer 109.

The light source 102 emits light L to the first beam splitter 103. The first beam splitter 103 splits emitted light L into a first light beam L1 and a second light beam L2. That is, half of the light L incident through the first beam splitter 103 is reflected, i.e. the first light beam L1, and the other half is transmitted, i.e. the second light beam L2. In the embodiment, the light source 102 is a collimating light source.

Referring to FIG. 1, the first polarizer 108 and the container 107 are positioned between the first beam splitter 103 and the first reflective mirror 104. That is, the first light beam L1 first passes through the first polarizer 108 and the container 107, and then is reflected by the first reflective mirror 104, finally incident into the second beam splitter 106.

Figure 2:
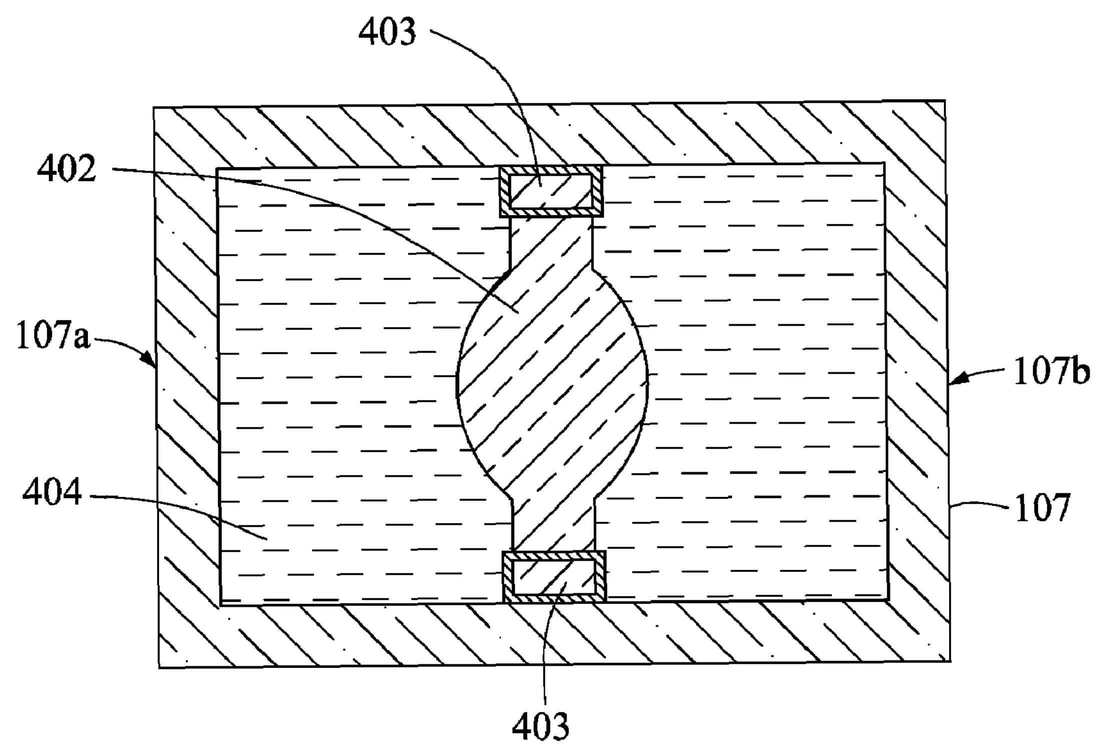
FIG. 2 is a schematic enlarged view of a container of the refractive-index measurement system of FIG. 1.

In the present embodiment, the lens 402 to be measured is accommodated in the container 107. Particularly, the lens 402 can be fastened in the container 107 via a fastening element 403, as shown in FIG. 2. The container 107 has opposite transparent lateral walls 107*a*, 107*b* to allow the first light beam L1 to pass therethrough. In addition, a medium 404 having a refractive index substantially the same as the theoretical refractive index $n_a$ of the lens 402, is filled into the container 107. Thus, the first light beam L1 will not change direction of propagation as it moves from the medium 404 into the lens 402. In the present embodiment, the medium 404 is in liquid form.

The second light beam L2 passing through the first beam splitter 103 is reflected by the second reflective mirror 105. In addition, the second polarizer 109 is positioned between the second reflective mirror 105 and the second beam splitter 106. Thus, the reflected light propagates through the second polarizer 109 and is eventually incident into the second beam splitter 106.

However, dispositions of the first polarizer 108, the container 107 and the second polarizer 109 are not limited to the disclosed configuration. It is equally suitable to sequentially locate the first polarizer 108 and the container 107 along an optical pathway of the first light beam L1, and the second polarizer 109 along an optical pathway of the second light beam L2. For example, the first polarizer 108 and the container 107 can be disposed between the first reflective mirror 104 and the second beam splitter 106, and the second polarizer 109 can be disposed between the first light beam splitter 103 and the second reflective mirror 105. However, it is noted that the first polarizer 108 and the second polarizer 109 cannot be perpendicular.

The refractive-index measurement system of the present embodiment further includes an image pickup device 110 configured for capturing an interference pattern resulting from the interaction of light waves from the first light beam L1 and the second light beam L2. The interference pattern is formed on a surface of the second beam splitter 106. In the present embodiment, the image pickup device 110 can be a charge-coupled device (CCD) or a complementary metal-oxide-semiconductor (CMOS).

The refractive-index measurement system further includes a computer 111 electrically connected to the image pickup device 110. The computer 111 is configured for processing data of the interference pattern captured by the image pickup device 110. Thus, the data of the interference pattern can be detected and analyzed automatically.

Figure 3:
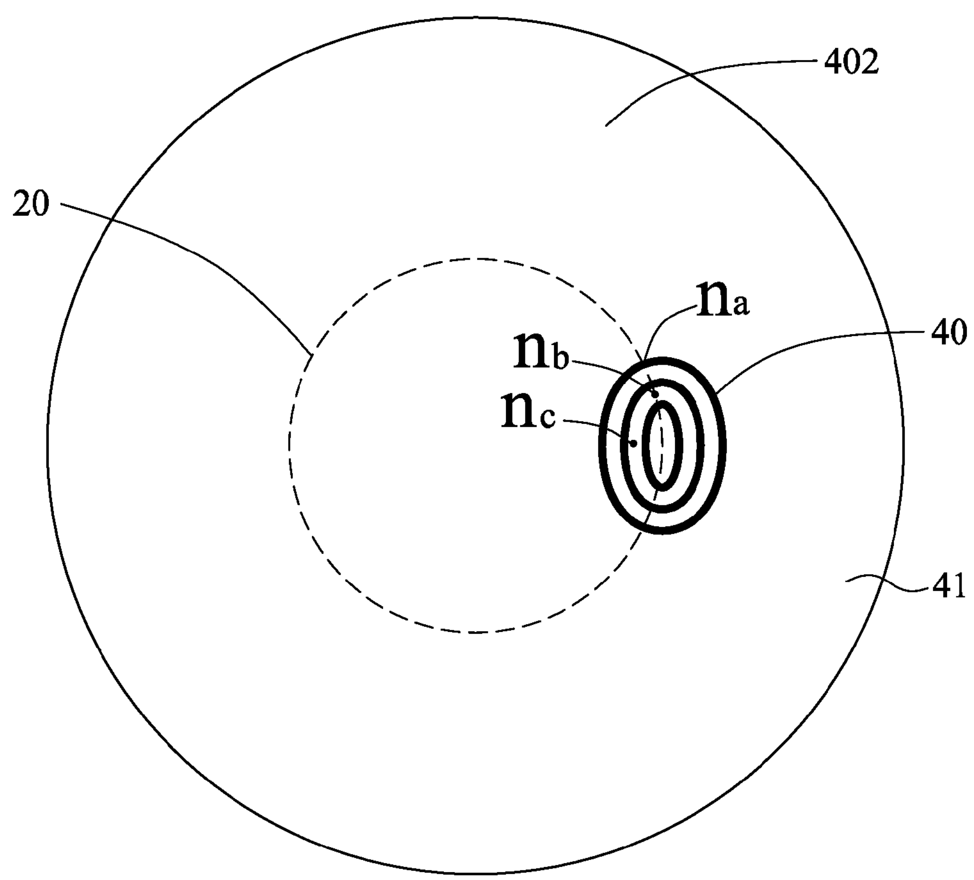
FIG. 3 is a schematic view showing an isopachous line and testing points selected on the lens of FIG. 1.
Figure 4:
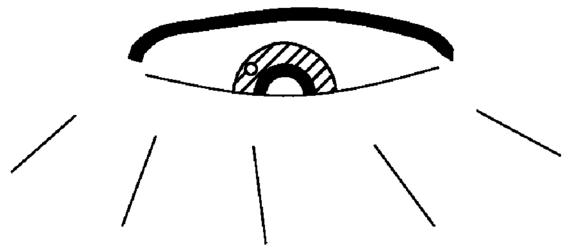
FIG. 4 is a schematic view of a conventional refractive-index measurement system.
Figure 4:
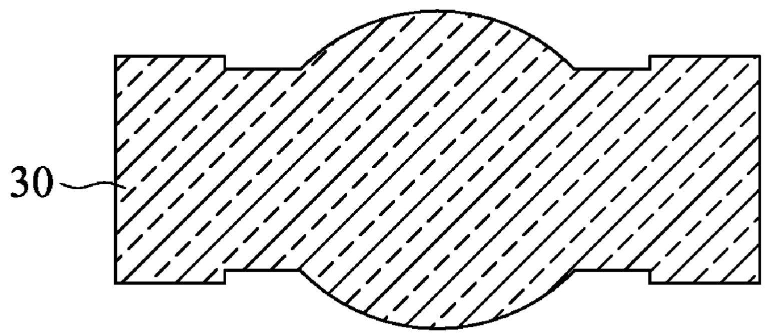

Additionally, referring to FIG. 1 and FIG. 3, a refractive-index measurement method for measuring a change in the refractive index $\Delta n_1$ of a lens 402 in accordance with a present embodiment, includes, in Step 1, the lens 402 with a theoretical refractive index $n_a$ is placed in the container 107, wherein the lens 402 includes a forced area 40 and another area 41 where no force is exerted. In Step 2, the light source 102 emits light L with a predetermined wavelength λ. In Step 3, an interference pattern formed on a surface of the second beam splitter 106 is captured, wherein the interference pattern includes a plurality of first light waves corresponding to the forced area 40 of the lens 402 and a plurality of second light waves corresponding to the another area 41 of the lens 40. In Step 4, an isopachous line 20 is drawn on the interference pattern through the first light waves and the second light waves, corresponding with a thickness $d_a$ of the lens 402. In Step 5, first testing point a and second testing point b are selected along the isopachous line 20. In Step 6 a number m of bright fringes or dark fringes between the first testing point a and the second testing point b are calculated. Step 7 obtains a value of refractive index $n_b$ of the lens 402 where the second testing point b is located based on values of the theoretical refractive index $n_a$ of the lens 402, the predetermined wavelength λ of light L, the thickness $d_a$ of the lens 402 through which the isopachous line 20 passes, and the number m of bright fringes or dark fringes between the first testing point a and the second testing point b; and in Step 8, the change in refractive index $\Delta n_1$ of the lens 402 is obtained by comparing the value of refractive index of the lens 402 where the second testing point b is located with the theoretical refractive index $n_a$ of the lens 402.

The method is described in more detail as follows.

Referring to FIG. 1, the lens 402 to be measured is accommodated in the container 107 and fastened via a fastening element 403. An area of the lens 402 where force is exerted is defined as forced area 40 of the lens 402, as shown in FIG. 3.

Light source 102 is activated to emit light L of a predetermined wavelength λ. The emitted light L is split into the first light beam L1 and the second light beam L2 by the first beam splitter 103. The first light beam L1 travels through the first polarizer 103, the container 107 accommodating the lens 402, the first reflective mirror 104, and the second beam splitter 106, in order. The second light beam L2 travels through the second reflective mirror 105, the second polarizer 109, and the second beam splitter 106, in order. In the present embodiment, the second light beam L2 does not pass through the lens 402, but is taken as a reference light beam. Because the first light beam L1 and the second light beam L2 are coherent, the first light beam L1 interacts with the second light beam L2 to obtain the interference pattern.

In the Step 3 the interference pattern on the surface of second beam splitter 106 is captured via the image pickup device 110, data of the interference pattern is then transmitted to the computer 111 where it can be processed. Referring to FIG. 3, because light beam L1, when passes the forced area 40 of the lens 402 and the another area 41 of the lens 402 has different density of light wave, the first light waves corresponding to the forced area 40 of the lens 402 and the second light waves corresponding to the other area 41 of the lens 402 cooperatively form the interference pattern.

In Step 4, upon creation on the interference pattern, isopachous line 20 passes through points of equal thickness of the lens 402. For example, $d_a$ represents the thickness of the lens 402 at the point through which the isopachous line 20 passes. In step 5, when two testing points along the isopach line 20, first testing point a and second testing point b, are selected, in the present embodiment, the first testing point a is located at the boundary between the first light waves and the second light waves while the second testing point b is located within the first light waves.

In Step 6, the number m of bright fringes or dark fringes between the first testing point a and the second testing point b is calculated, and in step 7, it is assumed that a refractive index of the lens 402 at first testing point a is substantially the same as the theoretical refractive index $n_a$. In addition, the value $n_b$ of refractive index of the lens 402 at second testing point b can be obtained by the following:

$$n_a \times d_a - n_b \times d_a = m\lambda$$

In step 8, the change in the refractive index $\Delta n_1$ of the lens 402 between the forced area 40 and the other area 41 is obtained accordingly by the following:

$$\Delta n_1 = n_a - n_b$$

Furthermore, in order to measure changes in the refractive index $\Delta n_2$ between any points within the forced area 40 and the another area 41, a third testing point c, at the bright or dark fringe where the second testing point b is located, is selected. A value of refractive index of the lens 402 at the third testing point c is obtained as follows:

$$n_c \times d_c - n_b \times d_a = 0$$

where $d_c$ is a thickness of the lens at the third testing point.

The change in the refractive index $\Delta n_2$ of the lens 402 between the third testing point c within the forced area 40 and the first testing point a can be estimated as follows:

$$\Delta n_2 = n_a \times n_c$$

As mentioned, the thickness $d_c$ of the lens 402 at the third testing point c can be measured by a micrometer, or, alternatively, based on the curvature of the lens 402.

Finally, it is to be understood that the described embodiments are intended to illustrate rather than limit the invention. Variations may be made to the embodiments without departing from the spirit of the invention as claimed. The embodiments illustrate the scope of the invention but do not restrict the scope of the invention.

What is claimed is:

1. A refractive-index measurement system for measuring a change in refractive-index of a lens, comprising:

a light source;

a first beam splitter splitting light from the light source into first and second light beams;

a first reflective mirror;

a second reflective mirror;

a second beam splitter;

wherein the first light beam is reflected by the first reflective mirror incident into the second beam splitter, and the second light beam is reflected by the second reflective mirror incident into the second beam splitter;

a container positioned along an optical pathway of the first light beam, the container accommodating the lens and being filled with a medium having a refractive index substantially the same as a theoretical refractive index of the lens;

a first polarizer positioned along the optical pathway of the first light beam; and a second polarizer positioned along an optical pathway of the second light beam.

2. The refractive-index measurement system as claimed in claim 1, further comprising an image pickup device capturing an interference pattern of light formed on a surface of the second beam splitter.

3. The refractive-index measurement system as claimed in claim 2, wherein the image pickup device is a charge-coupled device or a complementary metal-oxide-semiconductor.

4. The refractive-index measurement system as claimed in claim 2, further comprising a computer to process data of the interference pattern.

5. The refractive-index measurement system as claimed in claim 1, further comprising a fastening element to fix the lens in the container.

6. The refractive-index measurement system as claimed in claim 1, wherein the first polarizer and the container are positioned between the first beam splitter and the first reflective mirror.

7. The refractive-index measurement system as claimed in claim 1, wherein the second polarizer is positioned between the second reflective mirror and the second beam splitter.

8. A method for measuring a change in refractive index of a lens executed according to the refractive-index measurement system of claim 1, the method comprising:

placing the lens with a theoretical refractive index in the container, the lens comprising a forced area and another area where no force is exerted;

activating the light source to emit light of a predetermined wavelength;

capturing an interference pattern formed on a surface of second beam splitter, comprising a plurality of first light waves corresponding to the forced area of the lens and a plurality of second light waves corresponding to the other area of the lens;

drawing an isopachous line on the interference pattern through the first light waves and the second light waves, corresponding with a thickness of the lens;

selecting a first testing point and a second testing point along the isopachous line, the first testing point at the boundary between the first light waves and the second light waves, and the second testing point within the first light waves;

calculating a number of bright fringes or dark fringes between the first testing point and the second testing point;

obtaining a value of refractive index of the lens at the second testing point based on values of the theoretical refractive index of the lens, the predetermined wavelength of light, the thickness of the lens through which the isopachous line passes, and the number of bright fringes or dark fringes between the first testing point and the second testing point; and obtaining the change of refractive index of the lens by comparing the value of refractive index of the lens at the second testing point with the theoretical refractive index of the lens.

9. The measurement method as claimed in claim 8, wherein the value $n_b$ of refractive index of the lens at the second testing point is calculated in accordance with:

$$n_a \times d_a - n_b \times d_a = m\lambda$$

where $n_a$ is the theoretical refractive index of the lens, $\lambda$ is the predetermined wavelength of emitted light, $d_a$ is the thickness of the lens through which the isopachous line passes, m is the number of bright fringe or dark fringe between the first testing point and the second testing point.

10. The measurement method as claimed in claim 9, wherein the change in refractive index $\Delta n_1$ of the lens is estimated in accordance with $$\Delta n_1 = n_a - n_b$$

where $n_a$ is the theoretical refractive index of the lens, and $n_b$ is the refractive index of the lens at the second testing point.

11. The measurement method as claimed in claim 9, further comprising:

selecting a third testing point within the first light waves, the third testing point and the second testing point at the same bright fringe or dark fringe;

obtaining a value $n_c$ of refractive index of the lens at the third testing point in accordance with the following:

$$n_c \times d_c - n_b \times d_a = 0$$

where $d_c$ is a thickness of the lens at the third testing point, $n_b$ is the refractive index of the lens at the second testing point, and $d_a$ is the thickness of the lens through which the isopachous line passes; and estimating a change in refractive index $\Delta n_2$ of the lens in accordance with the following formula:

$$\Delta n_2 = n_a - n_c$$

where $n_a$ is the theoretical refractive index of the lens.

12. The measurement method as claimed in claim 8, wherein the thickness of the lens at the third testing point is estimated by a micrometer.

13. The measurement method as claimed in claim 8, wherein the thickness of the lens at the third testing point is estimated based on the curvature of the lens.

* * * * *